(12) United States Patent
Fitzgerald Washington

(10) Patent No.: US 12,263,952 B2
(45) Date of Patent: Apr. 1, 2025

(54) AUGMENTABLE AIR INJECTED PLENUM PROPULSION DRIVE FOR ELECTRIC VTOL OPERATION AND FLIGHT

(71) Applicant: George Fitzgerald Washington, Blythewood, SC (US)

(72) Inventor: George Fitzgerald Washington, Blythewood, SC (US)

(*) Notice: Subject to any disclaimer, the term of this patent is extended or adjusted under 35 U.S.C. 154(b) by 0 days.

(21) Appl. No.: 18/328,755

(22) Filed: Jun. 4, 2023

(65) Prior Publication Data

US 2024/0400211 A1 Dec. 5, 2024

(51) Int. Cl.
*B64U 10/20* (2023.01)
*B64D 27/24* (2006.01)
*B64C 29/00* (2006.01)

(52) U.S. Cl.
CPC ............ *B64D 27/24* (2013.01); *B64U 10/20* (2023.01); *B64C 29/0008* (2013.01); *B64C 29/0066* (2013.01)

(58) Field of Classification Search
CPC . B64D 27/24; B64C 29/0008; B64C 29/0016; B64C 29/0025; B64C 29/005; B64C 29/0058; B64C 29/0066; B64U 10/20
See application file for complete search history.

(56) References Cited

U.S. PATENT DOCUMENTS

| | | | | |
|---|---|---|---|---|
| 3,299,638 A | * | 1/1967 | Santamaria | B64C 29/0025 239/265.19 |
| 7,823,838 B1 | * | 11/2010 | De ning | B64C 15/02 244/55 |
| 7,883,051 B2 | * | 2/2011 | Sammy | B64C 29/0066 239/265.29 |

(Continued)

*Primary Examiner* — Woody A Lee, Jr.
*Assistant Examiner* — Behnoush Haghighian

(57) ABSTRACT

Here on Earth, there is a need and is quite essential that we keep moving. But we must be progressive in our living and livelihood while protecting and preserving our planet. There are places to go, people to meet, and business to be had. Designed with electric aircraft and flying cars or taxis in mind, the Augmentable Air Injected Plenum Propulsion Drive for Electric VTOL Operation and Flight is the first electric VTOL propulsion system to employ the concept of opposing air flow and cyclic column compression of those opposing flow(s) to pressurize a plenum chamber. Opposing flow and cyclic column compression is then harnessed for the purpose of augmenting, or amplifying, injected air to provide enhanced air/fluid power to an electric VTOL thrust system for the purpose of VTOL operation and horizontal flight and is multi-modal for VTOL and horizontal flight.
For VTOL operation, air is drawn in by injectors, compressed, and channeled into the plenum chamber which provides energized air to the ventral VTOL thrust assembly which further accelerates the air for vertical propulsion thrust. The PPD then goes into multi-mode transition by diverting air from the plenum chamber into rear injectors as they switch from injector mode to rearward thrust. This described synergistic process which is powered by electricity is what gives the Plenum Propulsion Drive the ability to provide power for flight while keeping the Earth healthy and green.

2 Claims, 11 Drawing Sheets

(56) References Cited

U.S. PATENT DOCUMENTS

| | | | |
|---|---|---|---|
| 8,074,917 B1 * | 12/2011 | Harrison | B64C 29/0066 |
| | | | 244/12.1 |
| 11,174,035 B2 * | 11/2021 | Tamada | B64C 27/32 |
| 2009/0242690 A1 * | 10/2009 | Sammy | B64C 29/0025 |
| | | | 244/12.5 |
| 2022/0144422 A1 * | 5/2022 | Welcel | F02K 5/00 |

* cited by examiner

AUGMENTABLE AIR INJECTED PLENUM PROPULSION DRIVE FOR ELECTRIC VTOL OPERATION AND FLIGHT

FIGURES

Figure 1:
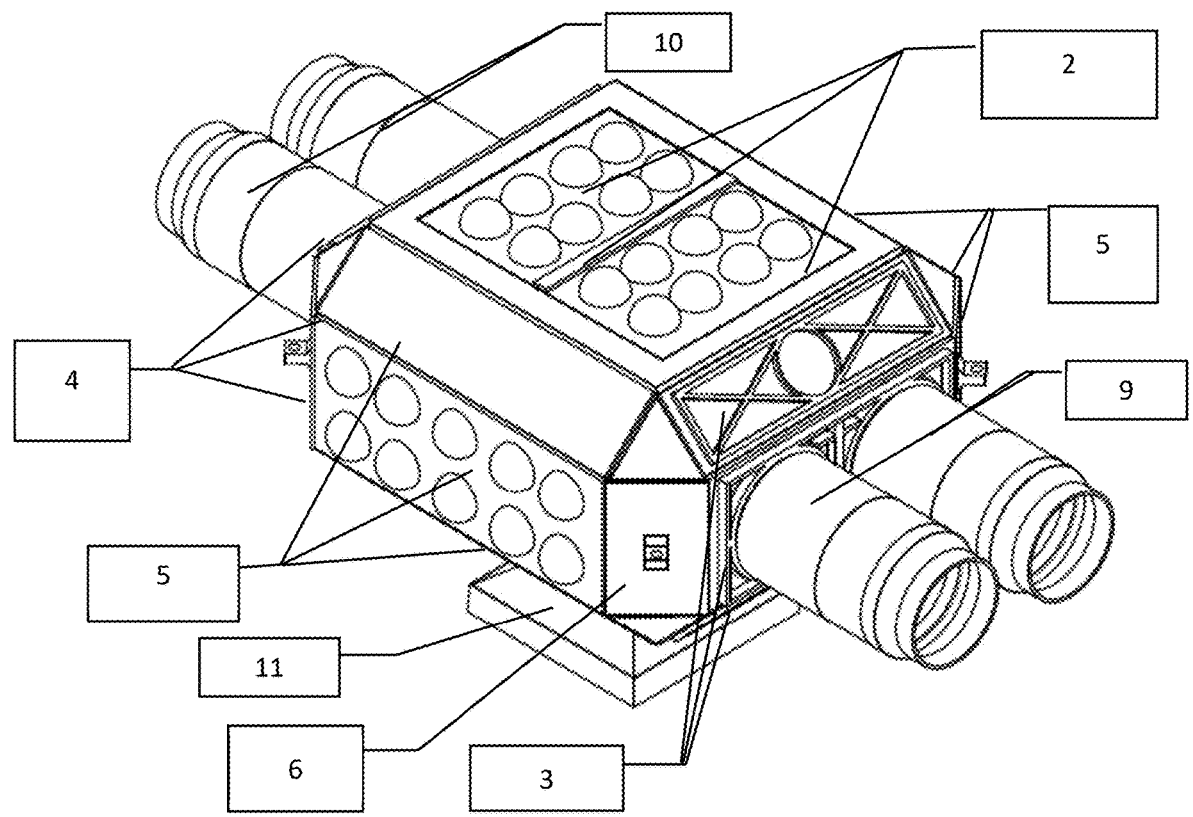

FIG. 1: Augmentable Air Injected Plenum Propulsion Drive perspective view

Figure 2:
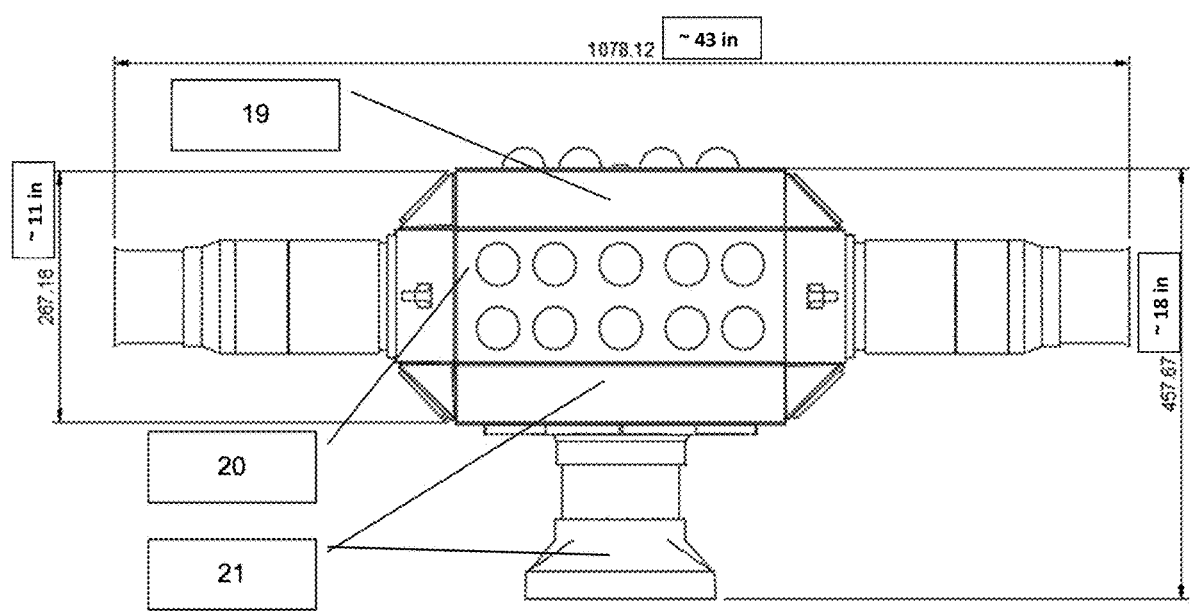

FIG. 2: Augmentable Air Injected Plenum Propulsion Drive (PPD): Side View

Figure 3:
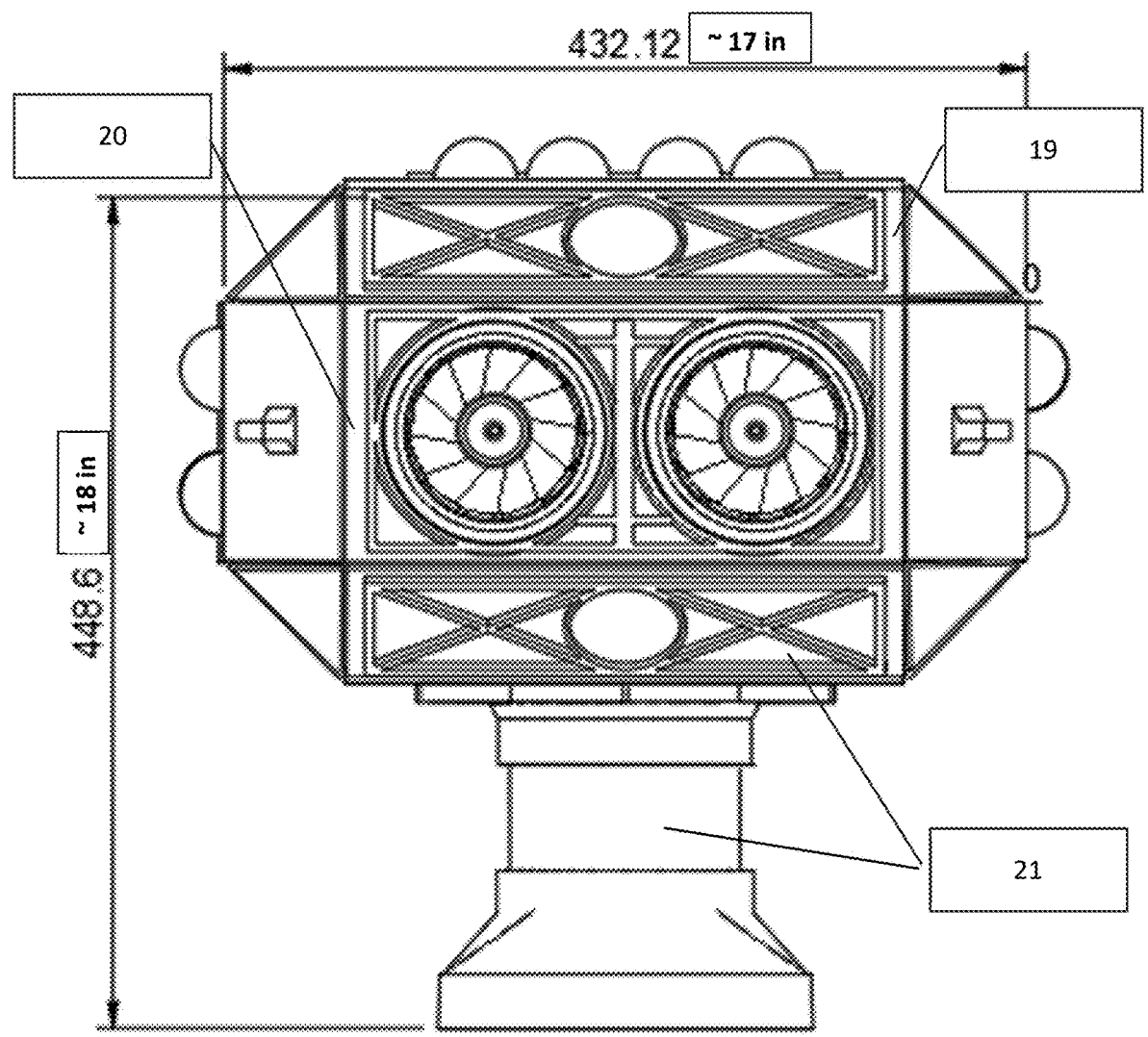
Figure 8:
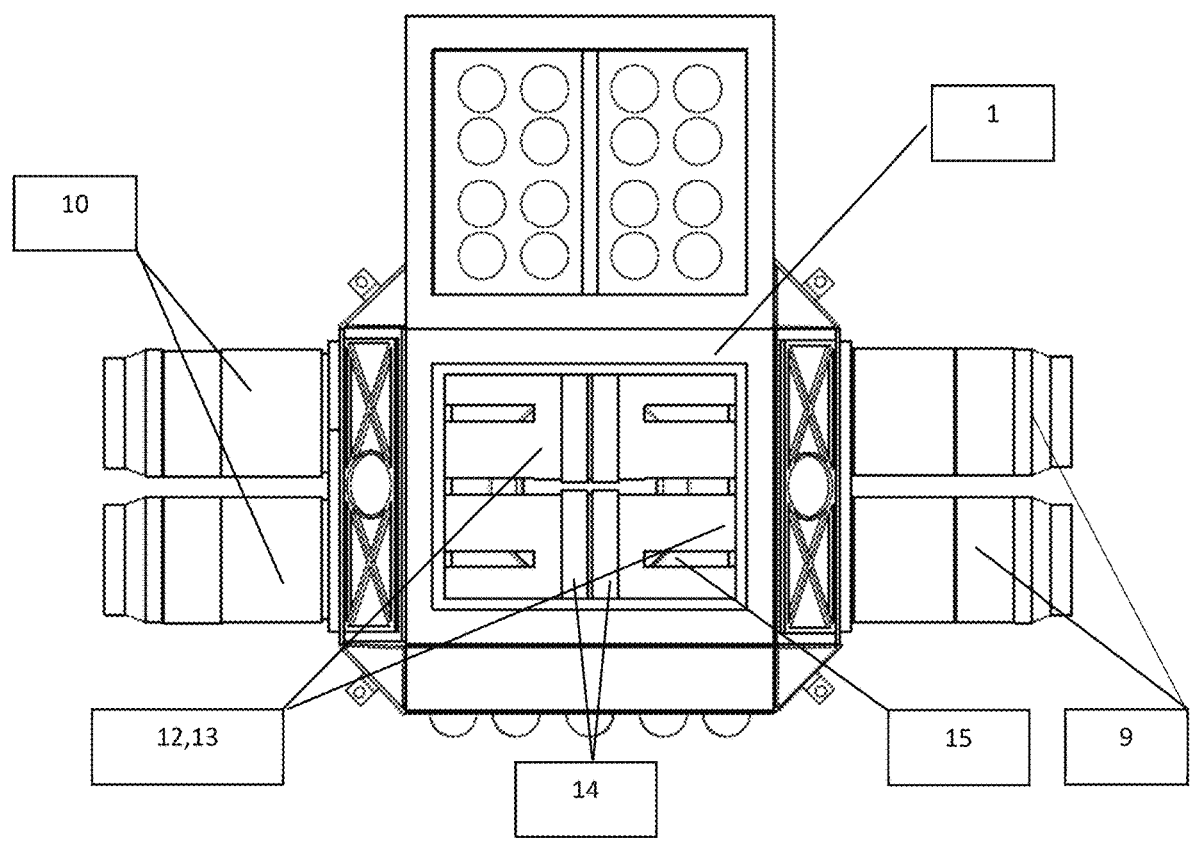
Figure 9:
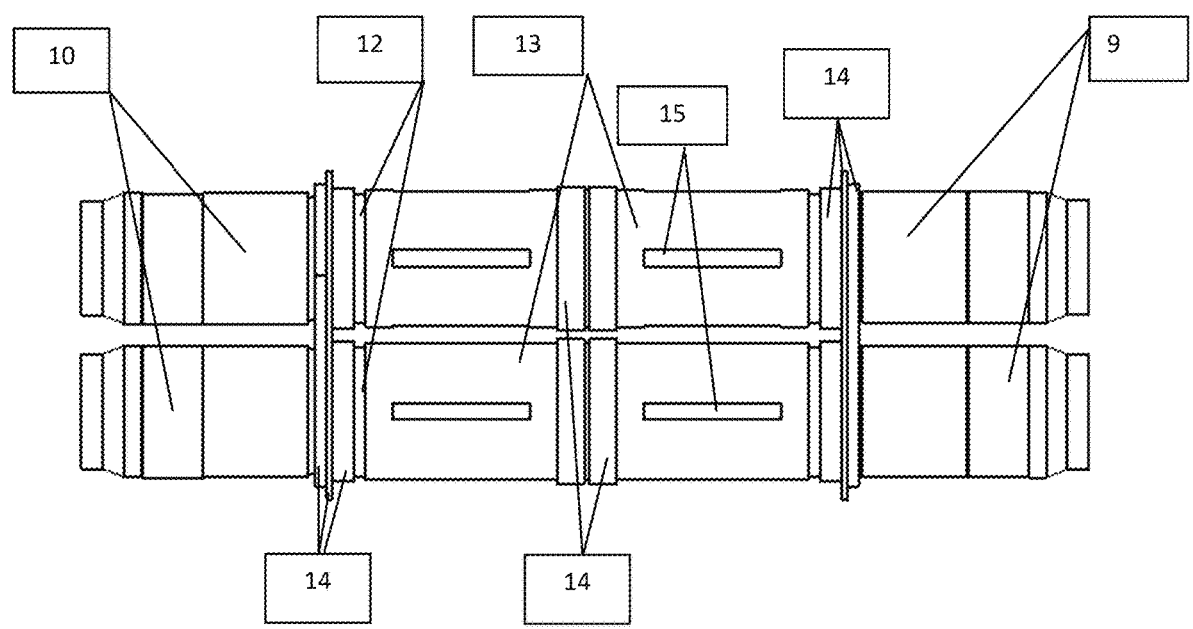
Figure 10:
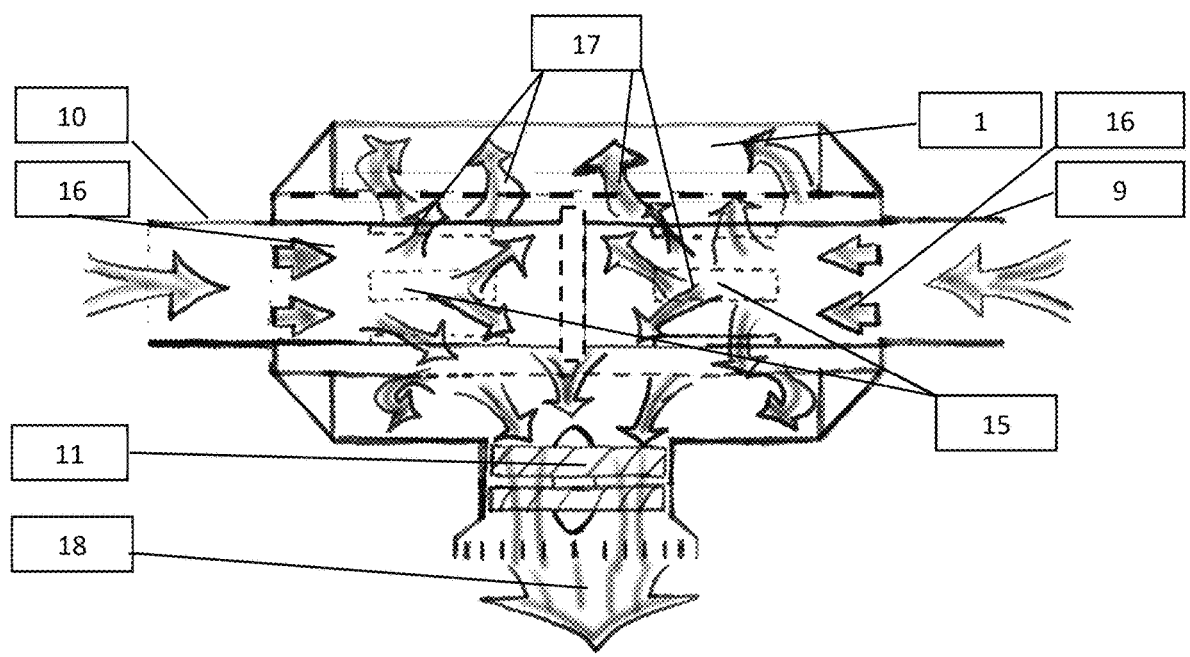
Figure 11:
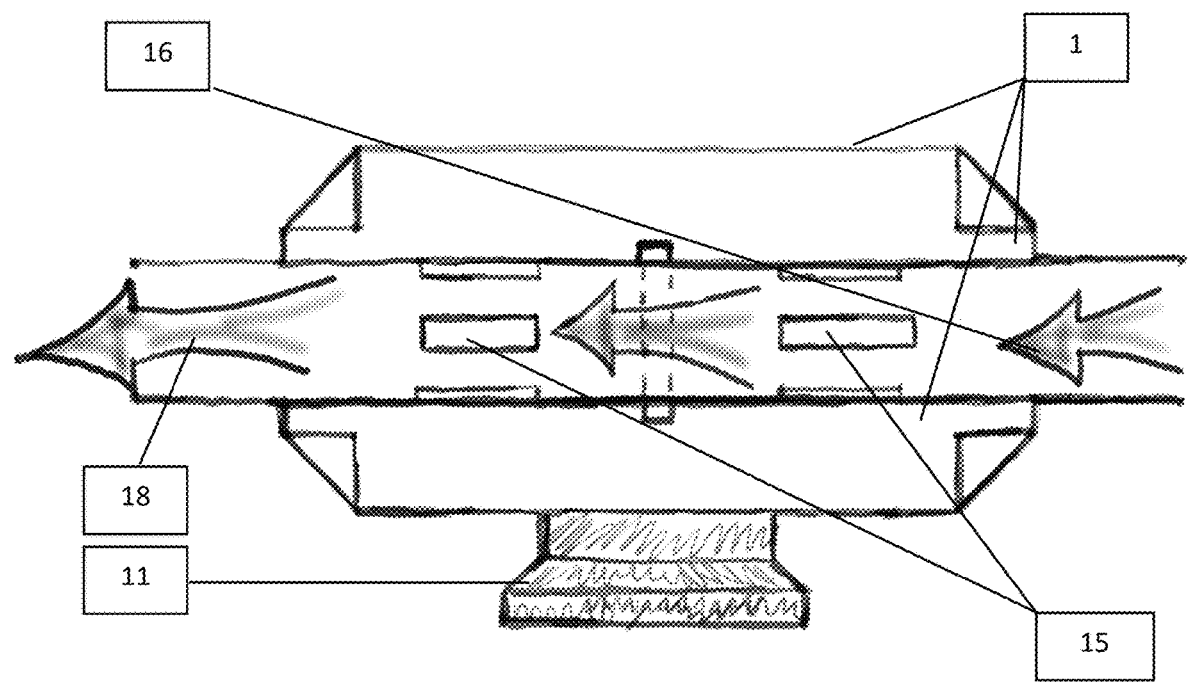

FIG. 3: Augmentable Air Injected Plenum Propulsion Drive (PPD): Front/Rear View FIG. 4: Augmentable Air Injected Plenum Propulsion Drive (PPD) with Thrust Tube Assemblies shown, Further Exploded Perspective View FIG. 5: Top View of PPD FIG. 6: Bottom View of PPD with Ventral VTOL Thrust Assembly FIG. 7: Side view of PPD with Ventral VTOL Thrust Assembly FIG. 8: Top view with plating removed; Thrust Tube Assembly shown FIG. 9: Exploded simple Top view of Thrust tube, Thrust tube sheath, and Injectors FIG. 10: Side exploded view showing airflow; Front/Rear Injectors, Thrust Tubes, Plenum, and Ventral VTOL Thrust Assembly in VTOL flight mode; Compression ports open FIG. 11: Side exploded view of laminar airflow in horizontal flight mode; Compression ports closed

LINE NUMBERS

1. Plenum Chamber Enclosure
2. Plenum Chamber Top plate
3. Forward End Plate; Upper, Middle, Lower
4. Rear End Plate; Upper, Middle, Lower
5. Plenum Side Plates; Upper, Middle, Lower
6. Plenum Corner Plates
7. Plenum Tri panels
8. Plenum Chamber Bottom Plate
9. Forward Dual Injector Assembly
10. Rear Dual Injector Assembly
11. Ventral VTOL Thrust Assembly
12. Thrust Tube Assembly
13. Thrust Tube Sheath
14. Thrust Tube Sheath Rotational Collars
15. Thrust Tube Compression ports
16. Airflow from Injectors
17. Compression Airflow
18. Augmented/Enhanced Resultant Air Flow Thrust

DETAILED DESCRIPTION

This is a generalized description of how the embodiment of the Plenum Propulsion Drive described in this RPA is made; it should be noted that a production model manufactured and utilized for the Aerospace Industry, or for private or commercial applications, of the PPD depicted and demonstrated for the principles of operation would be manufactured using standard or enhanced aerospace engineering practices. The narration of this prototype model is to satisfy the requirements of this non-provisional utility patent application to provide interested parties with the basic method of assembly. The proposed dimensions/measurements can slightly vary depending upon variations of the conceptual design but should maintain basic proportionate specifications to not compromise operation.

We can start with the basic shape of the embodiment of the Augmentable Air Injected Plenum Propulsion Drive for Electric VTOL Operation and Flight, which is called the Plenum Propulsion Drive, or PPD for short. The PPD is a symmetrical elongated polygon with 26 sides and 135-degree angles. The Plenum Chamber is approximately 20 inches long, 17 inches wide, and 11 inches in height. The overall length of the PPD is about 43 inches or about 3.5 feet in length, with forward and rear Injectors, and the overall height is about 18 inches, which includes the Ventral VTOL Thrust Assembly. Traversing parallel through the center of the polygonal enclosure, or Plenum Chamber, are two cylinders that cross through the center of the Plenum Chamber lengthwise. To re-emphasize, the 26-sided polygonal main enclosure is the Plenum Chamber, and thus, is the central enclosure by which we render the name . . . Plenum Propulsion Drive. Inside the enclosure of the Plenum Chamber, the two cylinders that traverse parallel through the center of the enclosure of the Plenum Chamber are attached to the Plenum Chamber both forward and rear by way of the Forward and Rear Middle End Plates.

For another twelve inches or so on either ends of the Plenum Chamber, the Injector Assemblies are attached forward and rear. The Injectors are detachable from the plenum chamber by way of the Forward and Rear Middle End Plates. As depicted by Lines 9 and 10, these Injectors—a total of four—make up another vital portion of the PPD. In essence, the Injectors are much like electric jet engines when in horizontal flight; but primarily, the Injectors do the job of primary compression for the Plenum Chamber when in VTOL operation mode. It should be noted that the Injectors are multi-stage units with at least two fans for compression and airflow acceleration. Located ventrally on the Plenum Chamber, there is another vital assembly known as the Ventral VTOL Thrust Assembly, depicted by Line 11, and provides thrust necessary for vertical thrust.

The PPD is primarily made of carbon fiber-reinforced polycarbonate with panels, cylinders, and electric motors. Other suitable materials for construction can be used as well. The structure or chassis upon which the plenum chamber is formed can be 3D printed or constructed by some other means available. The 3D-formed chassis has the panels and other unmovable parts epoxied to the chassis and then reinforced with some type of fastening mechanism. One method is to use aluminum-angled molding attached by epoxy and bolts for added structural integrity. The electric motors that comprise the EDFs can be procured as complete units from known sources and mounted on extruded components of the Injectors and of the Ventral VTOL Thrust Assembly. Although the EDFs for the Injectors and the Ventral VTOL Thrust Assembly can be procured, plus panel material, all other vital components in this description are 3D printed. It is important to note that since the PPD operates with a Plenum Chamber, it is important to ensure that the seals around all panels, injector mounts, and thrust tubes are sealed and secured to ensure zero to minimal leakage. Depicted in Line 1, the Plenum Chamber enclosure is comprised of three main sections. The top dome of the Plenum Chamber serves as the upper section of the compression chamber, providing the upper seal. This upper section consists of nine sides Including the top panel. Next, the center section of the Plenum Chamber comprises the Thrust Tubes and Thrust Tube sheaths—the Thrust Tube Assembly—as depicted by Lines 12 and 13. The purpose of the Thrust Tube Assembly is to either receive the primary compressed air from the four injectors and then pass that airflow to the plenum chamber for VTOL operation or to help redirect that airflow for horizontal flight operation. The mode change from VTOL to horizontal flight mode and then back to VTOL mode is done by switching from the passing of injected airflow into the Plenum Chamber to redirecting that airflow to the Rear Injectors, and in turn, the Rear Injectors reverse fan rotation for outward airflow for horizontal flight mode.

The Thrust Tube Assembly, which are equipped with Thrust Tube Sheaths for compression vent operation, controls and directs the compressed airflow from the Thrust Tubes to the Plenum Chamber. The Thrust Tube Sheaths control whether the Compression Vents of the Thrust Tubes are opened or closed. In this description for VTOL operation, the Thrust Tube Sheaths are rotated so that the Compression Vents are opened. When the Compression Vents are opened on the two Thrust Tubes, primary compressed airflow is passed into the Plenum Chamber for secondary dynamic compression for VTOL operation. The compressed, or augmented, airflow supplies the Ventral VTOL Thrust Assembly for vertical thrust. This center section also serves as the center seal and structure of the plenum chamber, having eight sides.

To reiterate, the secondary purpose of the center section of the Plenum Chamber, housing the Thrust Tube Assembly is to enable the PPD to switch modes from VTOL operation to horizontal flight. This is the key function that makes the PPD engine a multimode VTOL propulsion system. When the Compression Vents are open and the Forward and Rear Injector Assemblies are injecting opposing airflow, the PPD is in VTOL mode. When the Compression Vents are closed and the Forward Injector Assemblies inject flow and the Rear Injector Assembly reverses airflow, you are now in Horizontal flight mode; therefore, for horizontal flight mode, the EDFs of the two rear injectors of the Rear Injector Assembly change the direction of rotation and compression vents are closed. Subsequently, these two rear injectors change from inward injection to outward rear flow for horizontal flight.

How is the transition completed? Reverse rotation of the EDFs is accomplished using a reversal circuit; the rotation of the Thrust Tube Sheaths is accomplished by employing a mechanism, probably electro-mechanical. This transition happens within a few seconds. It should be noted that in other iterations of the above description of the suggested design and operation of the Thrust Tube Sheaths, the Thrust Tube Sheaths are designed to open and close Compression Vents by a linear displacement device, rather than by rotation. If the same objective of effectively opening and closing the Compression Vents is obtained, the operational performance or objective will not be compromised.

Finally, the lower portion of the Plenum Chamber of the PPD engine comprises the Ventral VTOL Thrust Assembly. This lower section of the Plenum Chamber has nine sides, with the bottom side comprising the Ventral VTOL Thrust Assembly, Line 11. The Ventral VTOL Thrust Assembly is comprised of a larger more robust EDF with a multi-staged fan thrust assembly. This EDF has a larger diameter fan and the assembly is multi-staged with at least one, or two, additional fans of greater size for greater airflow, thrust and acceleration of airflow. This lower portion of the plenum chamber receives the combined compressed airflow of the Plenum Chamber and the compressed airflow of the Forward and Rear Injector Assemblies, which is directed to the Ventral VTOL Thrust Assembly. This synergistic design and arrangement of components to inject opposing airflow and dynamically compress the air in the Forward and Rear Injector Assemblies and the Plenum Chamber, and then accelerating it out the Ventral VTOL Thrust Assembly, including its ability to transition for horizontal thrust, is what gives the Augmentable Air Injected Plenum Propulsion Drive for Electric VTOL Operation and Flight engine its multi-mode propulsion power for operation and flight.

Figure 4:
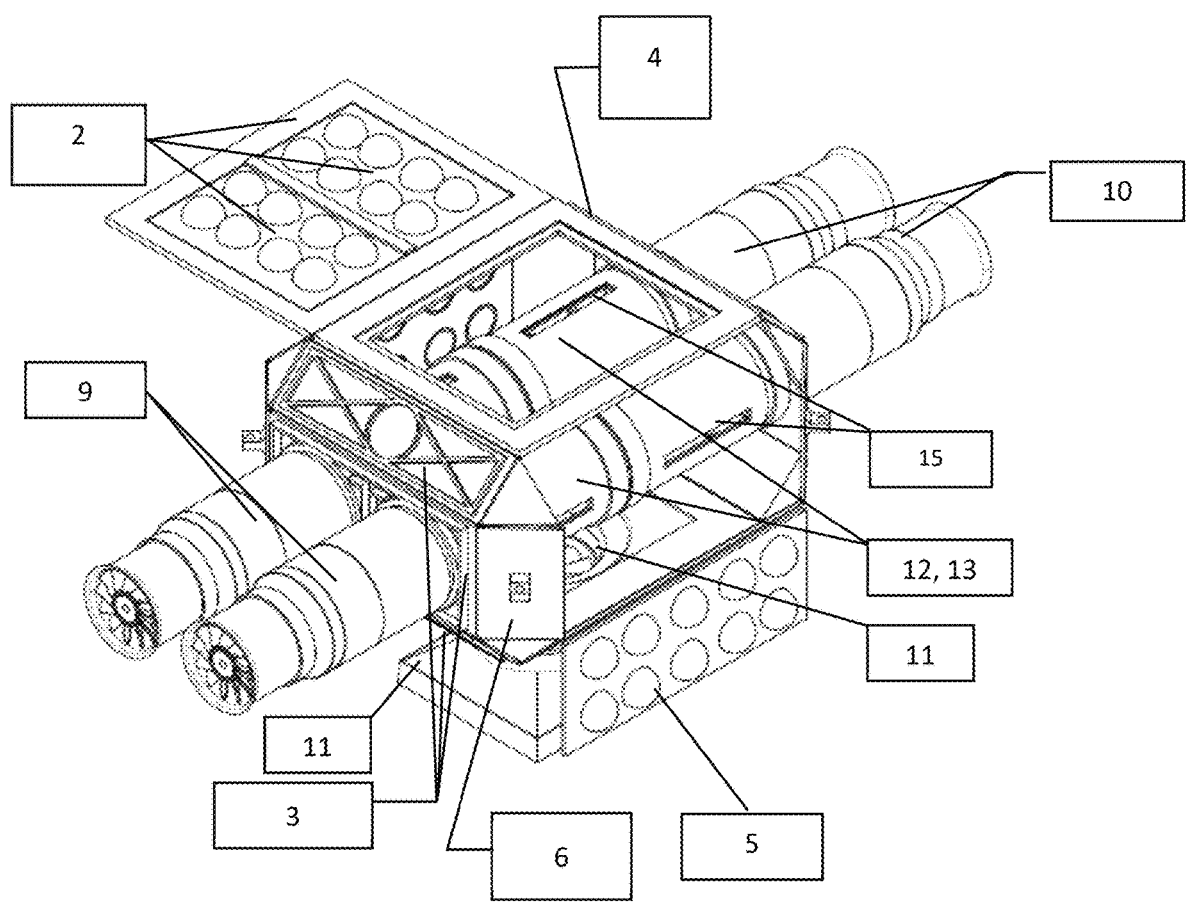
Figure 5:
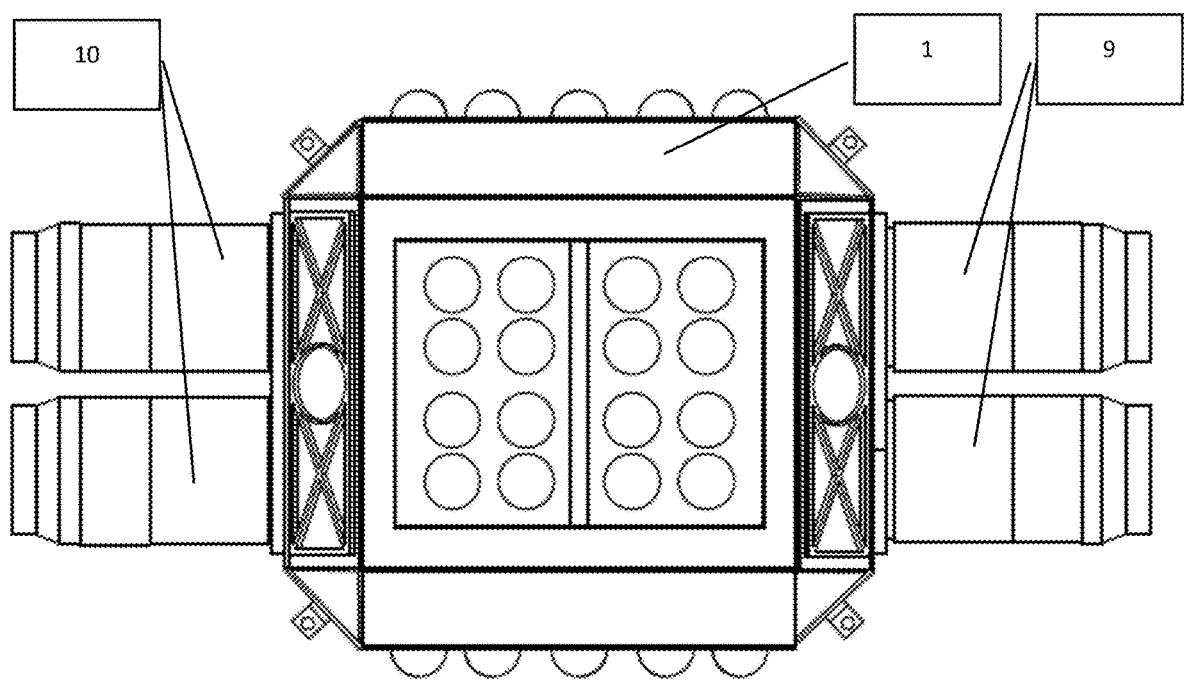
Figure 6:
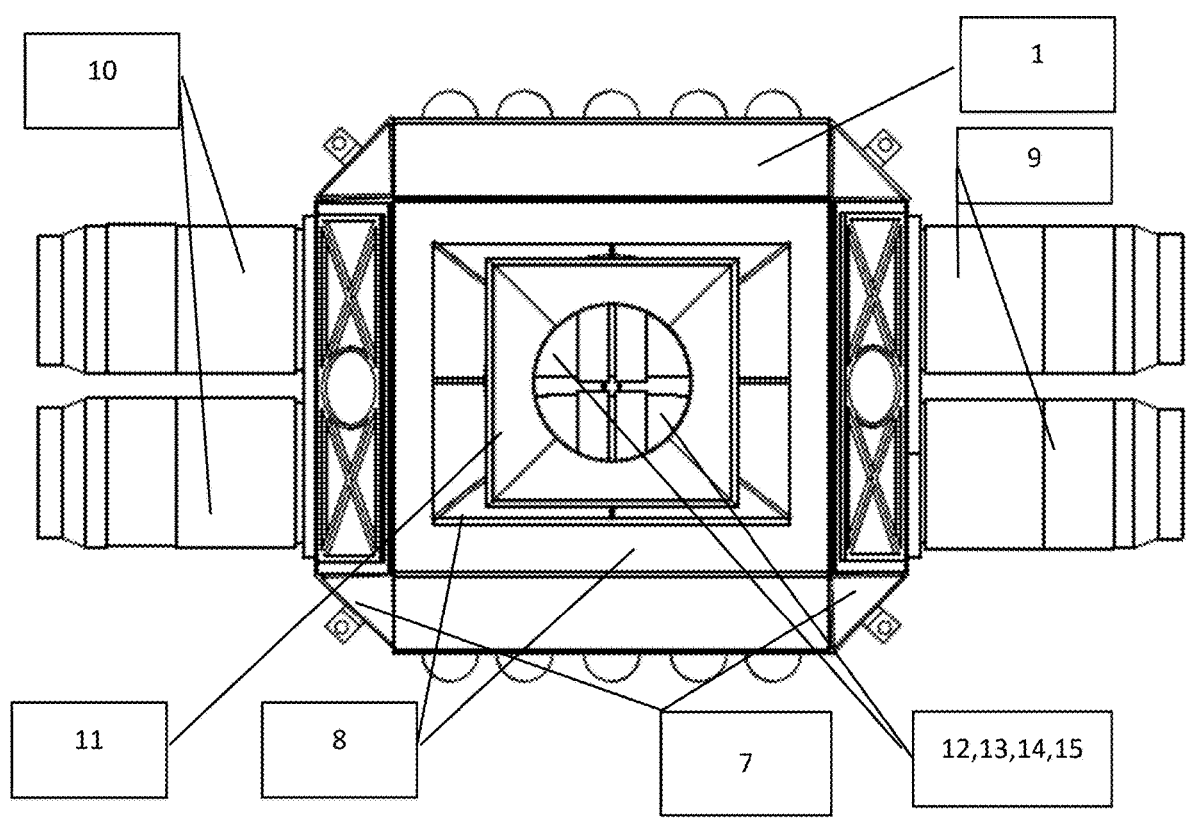
Figure 7:
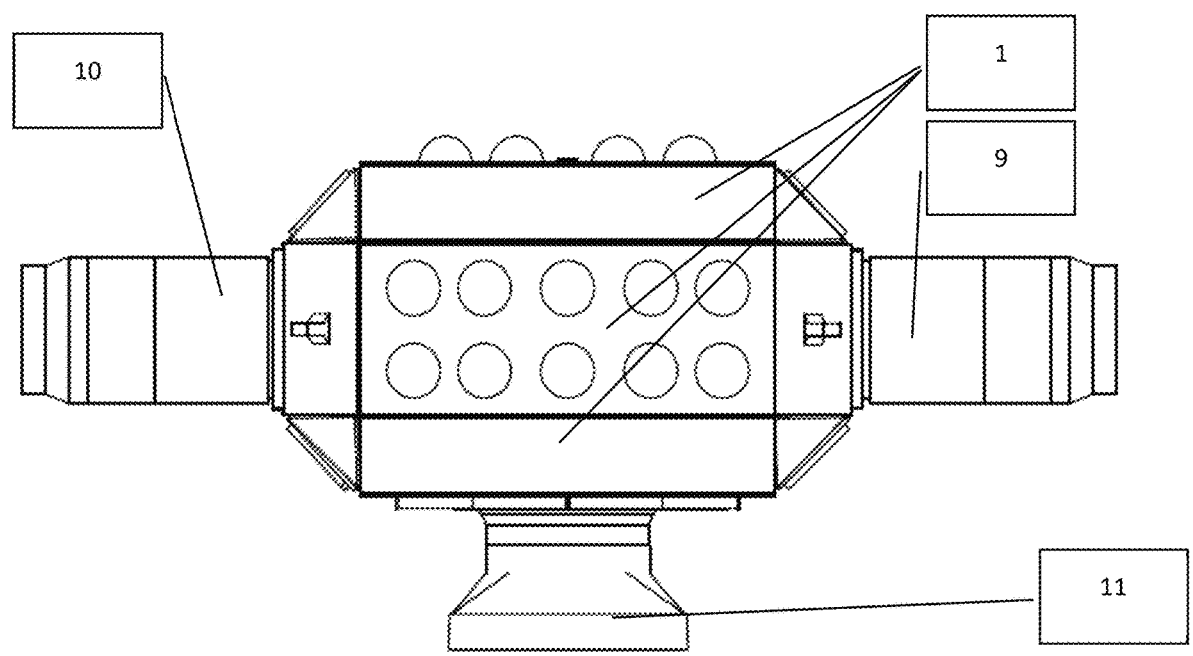

Operationally, the PPD consists of a Plenum Chamber which is the primary enclosure, which is depicted in FIGS. 5, 6, and 7, Line 1, and serves as the enclosure for the two Thrust Tube Assemblies, FIG. 4, Lines 12, 13, 14, and 15, which comprises the Thrust Tube Assemblies. The Thrust Tube Assemblies are affixed in a parallel horizontal plane proceeding through the middle of the plenum chamber from forward the Plenum Chamber to the rear. These two Thrust Tube Assemblies connect through two Middle End Plates both forward and rear Lines 3 and, which seal the Plenum Chamber and provide structural support while connecting the Injector Assemblies to the Thrust Tube Assemblies. The Plenum Chamber also consists of top, side, corner, and bottom panels that comprise the structure. The two Thrust Tube Assemblies have a dual pair of EDF motors as depicted in FIG. 4, Lines 9 and 10, both forward and rear of the Plenum Chamber enclosure. These two dual Forward and Rear Injector Assemblies, powered by EDFs, comprise the primary compression portion of the Injector Assemblies that feed the Plenum Chamber. Ventral to the plenum chamber is another EDF, the Ventral VTOL Thrust Assembly, Line 11, which is orientated at 90 degrees to the two parallel thrust tubes. The PPD system is synergistic in component relationship and operation for power production and aircraft propulsion.

The Forward and Rear Injector Assemblies are arranged in pairs, Lines 9 and 10; one paired Injector assembly (EDFs not shown) Lines 9 and 10, is attached forward of the Plenum Chamber, Line 1, and one Injector Assembly pair is attached at the rear of the Plenum Chamber. These dual-injector pairs, Lines 9 and 10, which are used to inject opposing airflows, FIG. 10, Line 16, to pressurize the Plenum Chamber, FIG. 10, Line 21, for VTOL operation, also change the direction of air flow for horizontal flight, FIG. 11, Line 16. These injector pairs, Lines 9 and 10, rotate at varying speeds to produce varying airflow velocity, volume, and rate of compression through the plenum chamber by way of the Thrust Tube Assemblies, FIG. 4; Lines 12, 13, 14, and 15 (Thrust Tube Assemblies), for horizontal flight. As stated before for VTOL operation, this arrangement provides varying airflow and dynamic pressure to the thrust plenum chamber, FIG. 10, Lines 16 and 17, simply by changing the direction of rotation and varying the opening or closing of Compression Vents; so, operationally, the flow can be redirected at 180 degrees by the Rear Dual Injector Assembly, Line 10, which employ forward rotation for compression and reverse rotation for forward flight.

The Ventral VTOL Thrust Assembly, Line 11, which is attached and located ventrally to the Plenum Chamber, generates downward thrust for VTOL operation. The Ventral VTOL Thrust Assembly, Line 11, augments, or enhances, the injector-fed pressurized airflow, FIG. 10, Lines 16, 17, and 18, by employing the Ventral VTOL Thrust Tube Assembly to generate downward thrust for direct, upward lift. The Thrust Tube Assemblies, which connect the Forward and Rear Dual Injector Assemblies, FIG. 9, comprise the Thrust Tube and Thrust Tube Sheaths, Lines 12 and 13 (Thrust Tube Assemblies), which provide a variable mechanism to open compression vents and allow passage of compressed airflow or close compression vents and redirect the velocity and force of airflow of the injector pairs. Compression ports on the Thrust Tube Assemblies, Line 15, that are controlled by the Thrust Tube Sheaths, Line 13, are opened, and then closed, depending on the transition and mode of operation in each Thrust Tube Assembly. With fully closed Thrust Tube Compression Ports, Line 15, laminar flow is augmented, or enhanced, for conventional horizontal flight; fully opened, and with Rear Injectors reverse rotating, the Thrust Tube Compression Vents enable redirected flow of injected Plenum Chamber pressurized airflow for optimum VTOL thrust. Therefore, the PPD engine operation is synergistic and enhances the velocity and volume of flow and compression of air of the Plenum Chamber which is injector-fed forward and rear, to provide enhanced power for the Ventral VTOL Thrust Assembly, Line 11, for optimum VTOL propulsion.

What is claimed is:

1. A method of operating an electric vertical takeoff and landing (VTOL) engine, the VTOL comprising:
    a plenum chamber designed to be pressurized, the plenum chamber being a symmetrical elongated polygon;
    two parallel cylindrical ducts passing through the plenum chamber such that the cylindrical ducts extend on both sides of the plenum chamber beyond the plenum chamber, the cylindrical ducts having a circular cross-section, and a diameter of the cylindrical ducts being smaller than a height of the plenum chamber, the cylindrical ducts being detachable from the plenum chamber;
    a slit opening compression vent on each one of the cylindrical ducts that opens inside the plenum chamber, the slit opening compression vents having rotatable thrust tube sheaths capable of opening and closing the slit opening compression vents;
    a bidirectional electric ducted fan injector installed on the front end and on the rear end of each cylindrical duct opposite of each other, the electric ducted fan injectors capable of rotation in clockwise and counter-clockwise directions;
    a ventral tube portion fluidly connected to the plenum chamber in a direction vertical to the two cylindrical ducts;
    a ventral thrust electric ducted fan installed on the end of the ventral tube portion opposite of the plenum chamber;
the method comprising takeoff and landing mode, and switching between takeoff and landing and forward cruise flight,
the takeoff and landing mode comprising:
    opening the plenum chamber slit opening compression vents to pressurize the plenum chamber;
    rotating the electric ducted fan injectors in opposite directions such that they both blow air toward the plenum chamber;
    rotating the ventral thrust electric ducted fan such that it blows air from the plenum chamber to outside of the plenum chamber until the VTOL takes off to a desired elevation;
the switching between takeoff and landing and forward cruise flight comprising;
    reversing the rotational direction of the rear end electric ducted fan injectors such that they both blow air to the outside of the cylindrical ducts;
    closing the slit opening compression vents;
    turning off the ventral thrust electric ducted fan.

2. An electric vertical takeoff and landing (VTOL) engine, the VTOL comprising:
    a plenum chamber designed to be pressurized, the plenum chamber being a symmetrical elongated polygon;
    two parallel cylindrical ducts passing through the plenum chamber such that the cylindrical ducts extend on both sides of the plenum chamber beyond the plenum chamber, the cylindrical ducts having a circular cross-section, and a diameter of the cylindrical ducts being smaller than a height of the plenum chamber, the cylindrical ducts being detachable from the plenum chamber;
    a slit opening compression vent on each one of the cylindrical ducts that opens inside the plenum chamber, the slit opening compression vents having rotatable thrust tube sheaths capable of opening and closing the slit opening compression vents;
    a bidirectional electric ducted fan injector installed on the front end and on the rear end of each cylindrical duct opposite of each other, the electric ducted fan injectors capable of rotation in clockwise and counter-clockwise directions;
    a ventral tube portion fluidly connected to the plenum chamber in a direction vertical to the two cylindrical ducts;
    a ventral thrust electric ducted fan installed on the end of the ventral tube portion opposite of the plenum chamber.

* * * * *